United States Patent
Ekanayake et al.

(10) Patent No.: US 8,747,533 B1
(45) Date of Patent: Jun. 10, 2014

(54) SYSTEMS AND METHODS TO DETERMINE FOULING IN A GAS TURBINE FILTER

(71) Applicant: BHA Altair, LLC, Franklin, TN (US)

(72) Inventors: Sanji Ekanayake, Mableton, GA (US); Alston I. Scipio, Mableton, GA (US)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 13/873,703

(22) Filed: Apr. 30, 2013

Related U.S. Application Data (63) Continuation-in-part of application No. 13/751,630, filed on Jan. 28, 2013.

(51) Int. Cl.
*B01D 39/00* (2006.01)

(52) U.S. Cl.
USPC ............ 96/417; 96/422; 95/1; 95/19; 55/483; 55/484; 55/341.1; 55/DIG. 34

(58) Field of Classification Search
USPC .................. 95/1–24, 273–287; 55/282–305, 55/361–382, 341.1–341.7, 490–519, 55/DIG. 26; 96/417–429; 60/39.01–39.83, 60/200.1–771
See application file for complete search history.

(56) References Cited

U.S. PATENT DOCUMENTS

| | | | | |
|---|---|---|---|---|
| 3,766,715 A | * | 10/1973 | Archer | ............................ 95/279 |
| 4,786,293 A | | 11/1988 | Labadie | |
| 4,824,450 A | * | 4/1989 | Howard | .......................... 96/421 |
| 5,572,327 A | | 11/1996 | Plinke et al. | |
| 6,875,256 B2 | | 4/2005 | Gillingham et al. | |
| 8,075,674 B2 | | 12/2011 | Raether | |
| 8,114,196 B2 | | 2/2012 | Lamee | |
| 2007/0039464 A1 | * | 2/2007 | Vanderhoof et al. | ............... 95/45 |
| 2009/0107337 A1 | | 4/2009 | Vu | |
| 2011/0314776 A1 | * | 12/2011 | Bloom | .......................... 55/392.1 |

* cited by examiner

*Primary Examiner* — Duane Smith
*Assistant Examiner* — Thomas McKenzie
(74) *Attorney, Agent, or Firm* — Reinhart Boerner Van Deuren P.C.

(57) ABSTRACT

A smart filter assembly is provided, the smart filter assembly having a fouling detection instrument and a communications module. The fouling detection instrument measures the weight of the filter assembly to indicate the degree of fouling. The communications module conveys the signal from the fouling detection instrument to a control system.

6 Claims, 12 Drawing Sheets

SYSTEMS AND METHODS TO DETERMINE FOULING IN A GAS TURBINE FILTER

CROSS-REFERENCE TO RELATED APPLICATIONS

This invention is a continuation-in-part to U.S. patent application Ser. No. 13/751,630, entitled METHOD, APPARATUS, AND SYSTEM FOR AIR FILTER CLEANING which was filed on Jan. 28, 2013, and is assigned to the same assignee as the present application and which is incorporated herein by reference.

TECHNICAL FIELD

The subject matter disclosed herein generally relates to filter systems for gas turbines and more particularly to systems for monitoring the degree of fouling of gas turbine filters.

BACKGROUND

To provide a safe and efficient operation, air entering a gas turbine for power generation applications is filtered. The gas turbine air inlet system may include an inlet filter house and associated ducting. In a typical installation, there may be between 300 and 800 filter elements attached to and projecting from a tube sheet, depending on the frame size of the turbine.

Current air filtration systems in service may be equipped with a functional self-cleaning system that utilizes compressed air to discharge a "puff" or blast of air into the filters to dislodge particles and debris and thus clean the filters. Standard operating methodology for the pulse control system for self-cleaning is driven by timers and solenoid valves sequencing that releases compressed air to "puff" the filters and dislodge particles.

Proper maintenance of gas turbine air filtration systems is critical. Poor quality air can significantly impact the operation, performance and life of a gas turbine. It is important that filters be cleaned or replaced once they are fully loaded with dust particles. Self-cleaning air filtration systems are automated systems which clean themselves when the pressure change across the filters reaches a specified level. This is completed through reverse air pulses. The degree of fouling of filters varies depending upon the location of the filter on the inlet filter house. Current filter systems do not provide adequate indication of fouling of specific filters or groups of filters. Consequently, filters may be cleaned or replaced unnecessarily.

BRIEF DESCRIPTION OF THE INVENTION

Disclosed herein are methods, apparatuses, and systems for air filter cleaning. In an embodiment, a method comprises determining filter house data at a time period crosses a threshold, wherein the threshold is based on a predetermined weight of a filter section. The method also comprising generating an alert message based on the determined crossing of the threshold. In another embodiment, an apparatus may comprise a processor and a memory. The memory may be coupled to the processor and have stored executable instructions that when executed by the processor cause the processor to effectuate operations that comprise: determining filter house data at a time period crosses a threshold, wherein the threshold is based on a predetermined weight of a filter section. The processor may also effectuate operations comprising generating an alert message based on the determined crossing of the threshold.

In another embodiment, a system may comprise a weighing subsystem, a pulse air subsystem, and a filter house control subsystem communicatively connected with the weighing system and the pulse air system. The filter house control system may comprise a processor and a memory. The memory may be coupled to the processor and have stored executable instructions that when executed by the processor cause the processor to effectuate operations that comprise: receiving weight data of a first filter section from the weighing subsystem; determining filter house data including the weight data at a time period crosses a threshold, wherein the threshold is based on a predetermined weight of a filter section. The processor may also effectuation operations comprising providing instructions to the pulse air subsystem based on the determined crossing of the threshold.

In another embodiment a filter assembly includes a filter element; a supporting structure connected to the filter element; and a fouling detection assembly attached to the filter component. The fouling detection component includes a fouling detection instrument; and a communication module.

In another embodiment, a filter system includes a filter house and a plurality of filter assemblies disposed in the filter house. Each of the plurality of filter assemblies includes a filter component. At least one of the filter assemblies includes a fouling detection instrument; and a wireless communication module.

In another embodiment, a method for servicing a filter system having a plurality of filter assemblies, includes measuring the degree of fouling in at least one of the plurality of filter assemblies; wirelessly communicating the degree of fouling; and servicing the filter system when the degree of fouling exceeds a predetermined level.

This Brief Description of the Invention is provided to introduce a selection of concepts in a simplified form that are further described below in the Detailed Description. This Brief Description of the Invention is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Disclosed herein are methods and systems that may determine the location of dirty air filters. A pulse air system may be automatically triggered to clean the affected filters. A range of weight values between a loaded (i.e., dirty) and unfilled (i.e., clean) filters may be used to start or stop a pulse air system, and otherwise direct maintenance of filters.

Data from the disclosed methods and systems may be available to gauge the efficiency of an air filtration system by monitoring the amount of dust residue collected in the air filtration system and giving an indication as to the filters that have the propensity for higher loading rates. With post installation data, it may also be possible to interpolate and identify the approximate location of filter irregularities, such as an unseated filter, a filter rupture, a damp filter, and the like, based on filter loading rates, among other things. This information may permit an operator to make appropriate adjustments for proactive compliance with filtered air specifications rather than being notified after-the-fact by a differential pressure or other warning.

Figure 1:
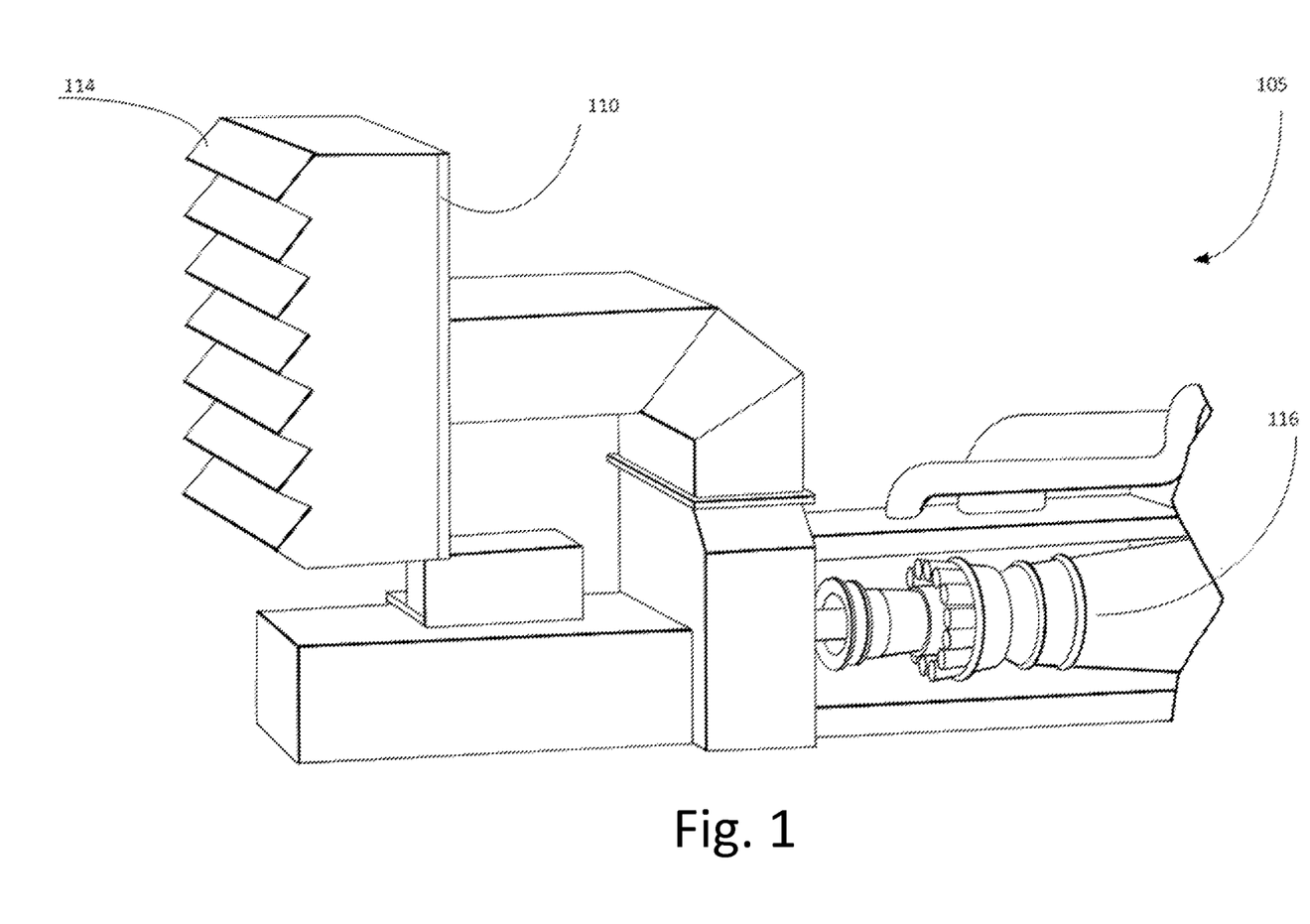
FIG. 1 is an exemplary illustration of a power plant system.

FIG. 1 is an exemplary illustration of a power plant system 105. In normal operation, inlet air flows into the inlet filter house 110 via the inlet hoods 114, and through a plurality of filter elements. The filtered inlet air passes through a compressor connected with a gas turbine 116. High pressure air from the compressor enters the combustion section of the gas turbine 116 where the air may be mixed with fuel and burned.

Figure 2:
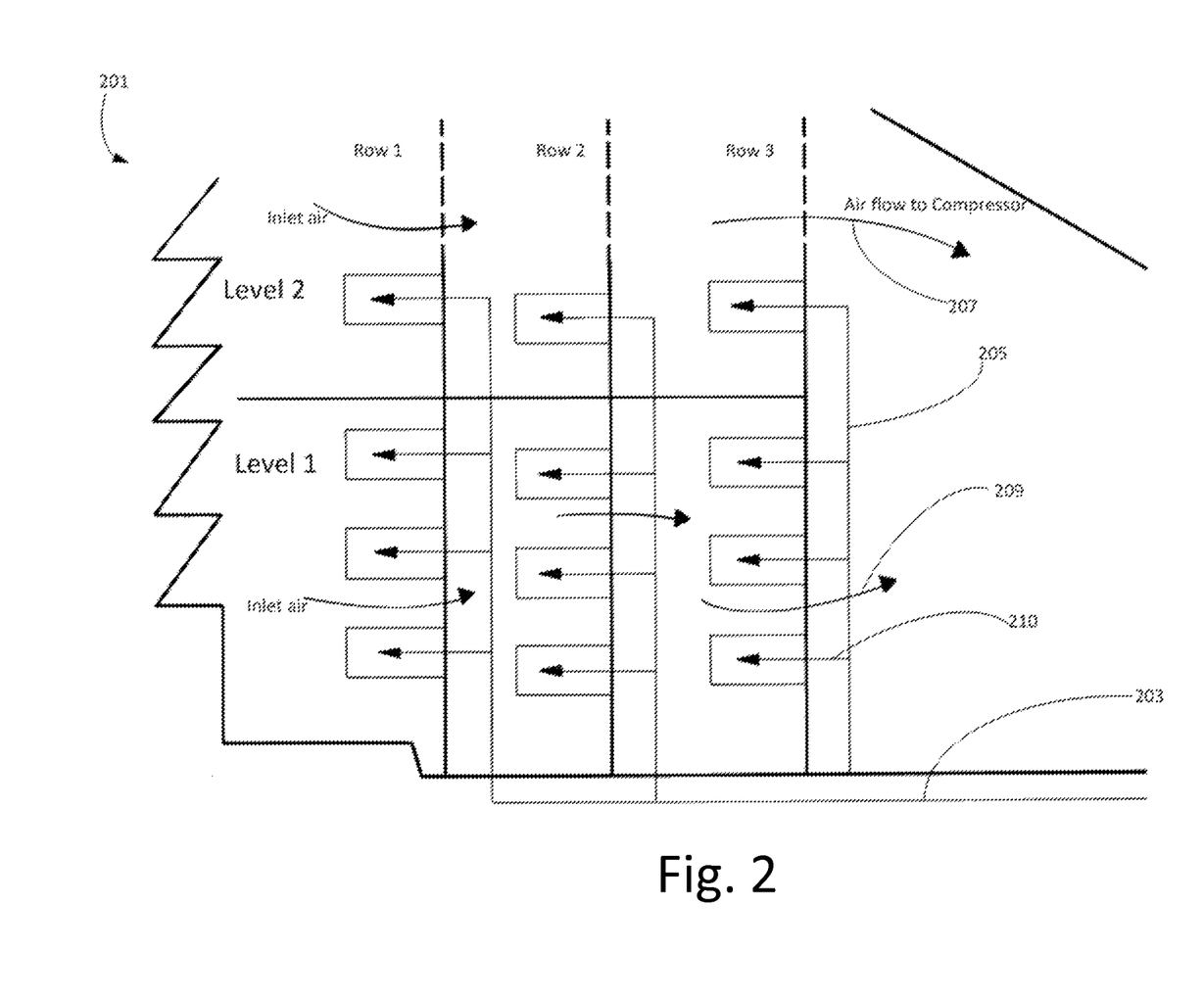
FIG. 2 is an exemplary block diagram of a transparent side view of an inlet filter house.

FIG. 2 is an exemplary block diagram of a transparent side view of an inlet filter house. Two levels of the inlet filter house 201 are shown. The inlet filter house 201 may have multiple rows of filters, wherein each row of filters may be designed to filter out particles of different sizes. In an embodiment, Row 1 may comprise coarse or prefilters which may be used to filter out large particles, Row 2 may comprise intermediate filters for filtering intermediate size particles, and Row 3 may comprise fine filters for fine particles. Arrows 207 and 209 display the direction of air flow from the inlet to an air compressor of a gas turbine. A main pulse air ("puffer") piping 203 may branch along the rows of filters, such as piping 205 along Row 3. Pulse air pipe 205 along Row 3 may branch out again and may be distributed to pulse air into filter sections in Row 3, such as piping 210.

Figure 3:
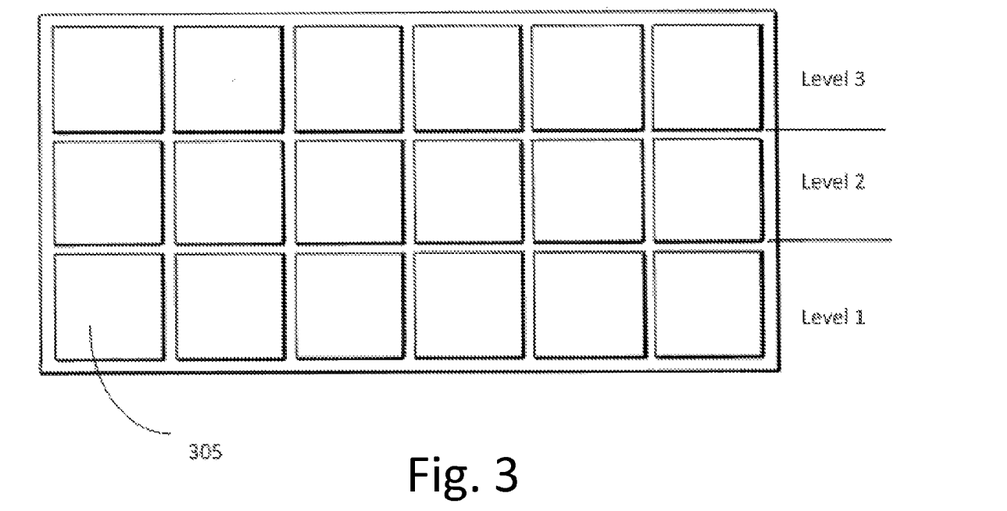
FIG. 3 is an exemplary block diagram of a front view of an inlet filter house that may have three levels.

FIG. 3 is an exemplary block diagram of a front view of an inlet filter house that may have three levels. As shown, the filter house has the three levels divided into segments, shown as rectangular polygons that may be monitored and cleaned. In an embodiment, the block of filters identified by segment 305 may be described as Level 1-1 referring to the first segment on Level 1. Segmentation shown herein is exemplary. The number and extent of segmentation is dependent on the implementation.

Figure 4:
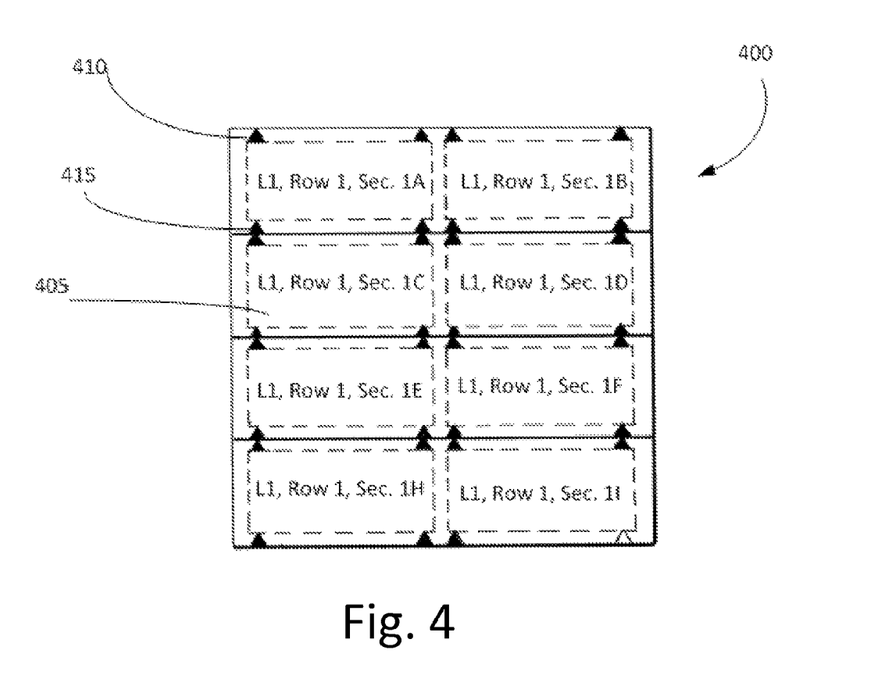
FIG. 4 is an exemplary block diagram of a front view of a subdivided segment of air filters.

FIG. 4 is an exemplary block diagram of a front view of a subdivided segment of air filters as discussed herein. For example, larger segments of air filters (e.g., segment 305) may be subdivided into smaller segments, as shown in segment 400. Subdivided segment 405 may be identified as L1, Row 1, Sec. 1C (i.e., Level 1, Row 1, Section 1C). Subdivided segment 405 may comprise a filter house tube sheet. Subdivided segment 405 may support a plurality (usually hundreds) of filters, such as cartridge-type hollow filter elements. Each section of filters may have a device that measures weight, such as a compression type strain gauge load cell 415 or a tension type strain gauge load cell 410. As displayed herein, the compression type strain gauge load cell 415 may be installed at the bottom of each section. The tension type strain gauge load cell 410 may be installed at the top of each section.

After installation and calibration of the tension or compression strain gauge load cell system, the weighing system may be calibrated utilizing the weights of the group with all new and clean filters. After calibration, additional weight detected by the system after being placed in service may be attributed to dust and debris capture. As the weight increases it may compress or increase tension to the strain gauge mechanism. A design approach may incorporate miniature all stainless compression or tension strain gauge load cells in the suspension system with modifications to the supporting mechanism. For example if a spring is used in the design then the tension and compression type strain gauge may be used. If a spring mechanism is not used, supports can be mounted on a disc shaped compression strain gauge load cell.

Currently, load cells may be applied to loads from 0-500,000 pounds with accuracy of 0.03% to 0.25% full scale. With this in mind an appropriate load cell for the load range application may be selected along with the appropriate secondary auxiliary components to determine the incremental weight of the group of filters attributable to the filters increased dust loading. This overall weight increase, which may be normalized to individual filter loading, may be used to command the self-cleaning system to operate. The pulse air system may be set to inactive when the filter section loading is within a predetermined acceptable "normal" range.

Filters utilized in a filter house may have known new and clean weights, which may be based on performance testing. Manufactures may also provide information with regard to the dust holding capability of the filters. Table 1 is an example of information that may be used to calibrate and determine a baseline for a filter section (e.g., subdivided segment 405). In this example the null value for the strain gauge calibration will be 3990 lbs. As can be calculated from Table 1, when filters are dirty there is an approximately 91% reduction in air flow and the per filter weight increase is approximately 75%. Through the use of interpolation or testing, a range of values of weight and corresponding air flow between the loaded and new/clean values may be determined and used for controlling an efficient operating sequence of a filter "puffer" system, an alert system, and other communicatively connected systems.

TABLE 1

Section structural weight = 3750 lbs.
Filter section size = 150 filters
Weight of clean/new filter = 1.6 lbs.
Air flow of clean filter = 32 cfm
Weight of dirty filter = 3.1 lbs TABLE 1-continued Air flow of dirty filter = 3 cfm
Weight of filters in section (new/clean) = 1.6 * 150 = 240 lbs.
Section Weight of clean filters = 3990 lbs.

Figure 5:
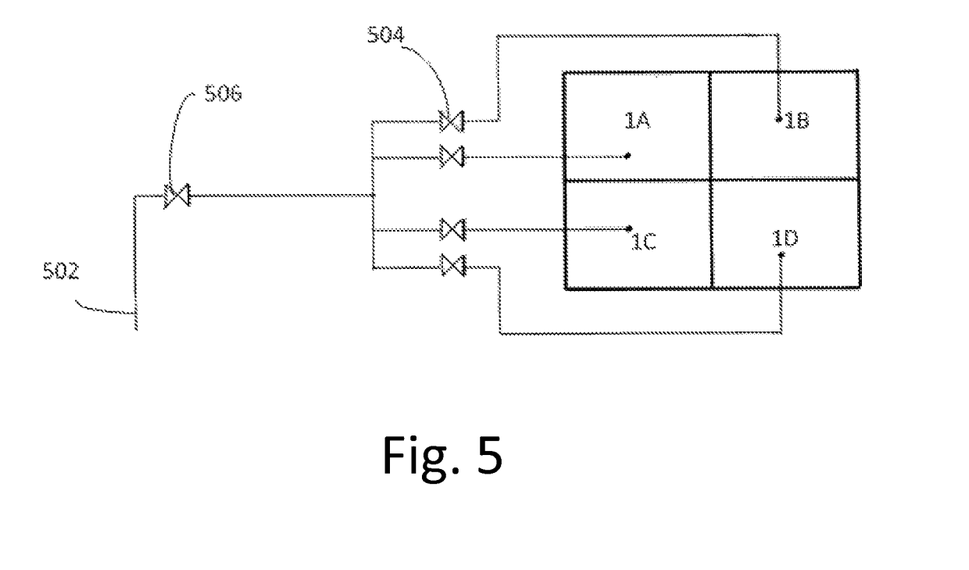
FIG. 5 is an exemplary block diagram of a front view of a subdivided segment of air filters.

FIG. 5 is an exemplary block diagram of a front view of a subdivided segment of air filters, as discussed herein. As shown, an exemplary pulse air supply 502 may be directed to different sections. Solenoid valves 504 and 506, for example, may be actuated to clean the filter section 1A based on a predetermined threshold weight of filter section 1A, for example.

Figure 6:
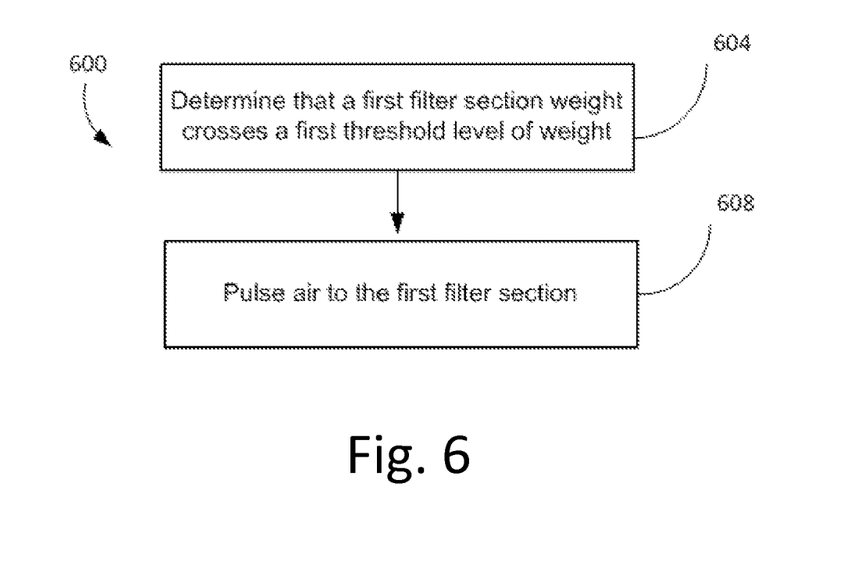
FIG. 6 illustrates a non-limiting, exemplary method of implementing a filter monitoring and cleaning system.

FIG. 6 illustrates a non-limiting, exemplary method 600 of implementing a filter monitoring and cleaning system. At 604, the weight of a first filter section may be determined to cross a first threshold weight level. At 608, air may be pulsed ("puffed") based on the first filter section weight crossing the first threshold level. The first section filter weight may comprise the weight of filters as well as the weight of structural elements, such as structures that hold the filters in place. In an embodiment, the section of filters may be supported in a slot support structure. This supporting mechanism may minimize filter vibration and allow the filter section to move in the vertical plane when the weight increases for the filter section. The mass of each filter element may increase with added dust, which loads the filter section moving it down. Total incremental weight may be determined via compression or tension strain gauges strategically located based on the supporting design. In an embodiment, the structure may be configured so that horizontal instead of, or in addition to, vertical expansion may be measured.

The air pulse mentioned in at 608, may be done automatically or manually by an operator alerted by the system. The number of pulses or the duration of pulse system activation/operation may be set in a filter control system to a predetermined value which may be based on a predetermined relationship between filter dust loading and a reduction of air flow. In an embodiment, the first filter section may be puffed until a second threshold is crossed. The second threshold may be based on a weight of the first filter section that corresponds to an acceptable air flow. For example, the puffs may continue until the first filter section reaches a predetermined weight that is less than or equal to the second threshold. In another embodiment, the number of puffs needed to reduce the weight of the filter section may be taken into account in order to determine whether a filter section may have a filter irregularity, which may, for example, indicate the filters should be changed.

Figure 7:
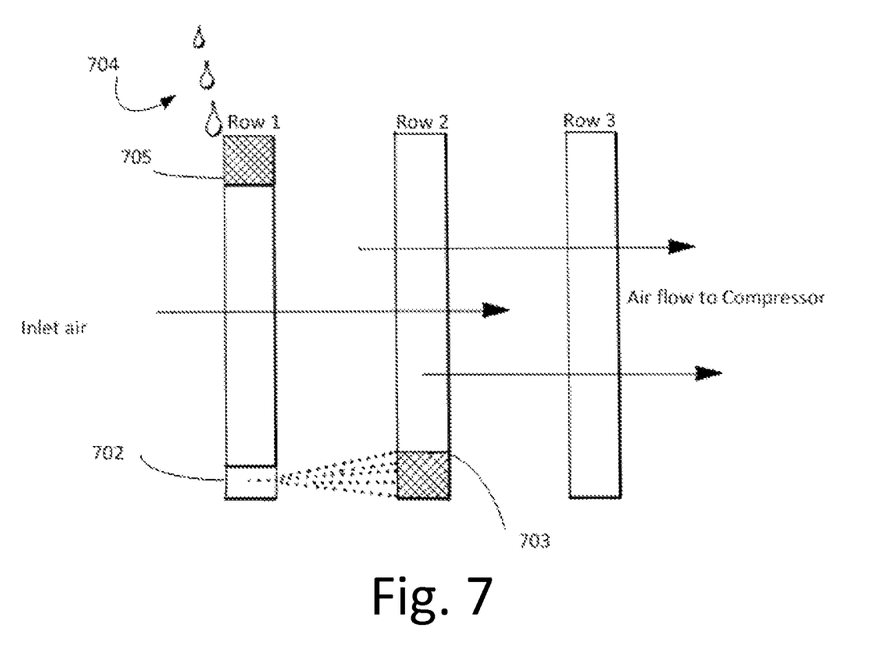
FIG. 7 is an exemplary block diagram of a side view of a level in an inlet filter house.

FIG. 7 is an exemplary block diagram of a side view of a level in an inlet filter house. Inlet air may flow from Row 1 through Row 3 into a compressor of a gas turbine. With so many filters damage to one or more filters may occur. For example, during operation, as shown in Row 1, a liquid fluid leak 704 (e.g., water from the outside) may dampen the filter which may distort the air flow in the affected section or sections. Also during operation, a filter may rupture or become unseated at area 702, which may allow unfiltered air to bypass the filtration system and proceed downstream to downstream filtration area 703. The bypass of unfiltered air through area 702 can accelerate the loading of the downstream filtration area 703. If a rupture is in Row 3, then the rupture may cause unfiltered air to enter the compressor unabated and accelerate compressor component erosion. Algorithms may be developed to recognize the different alarm conditions. In an embodiment, in addition to weight, differential pressure may be taken into account to determine what type of filter irregularity may be affecting air flow, to determine whether a filter should be pulsed, or to determine another action to be taken. Filter irregularities may include unseated filters, damp filters (e.g., because of leaks), ruptured filters, and the like.

Figure 8:
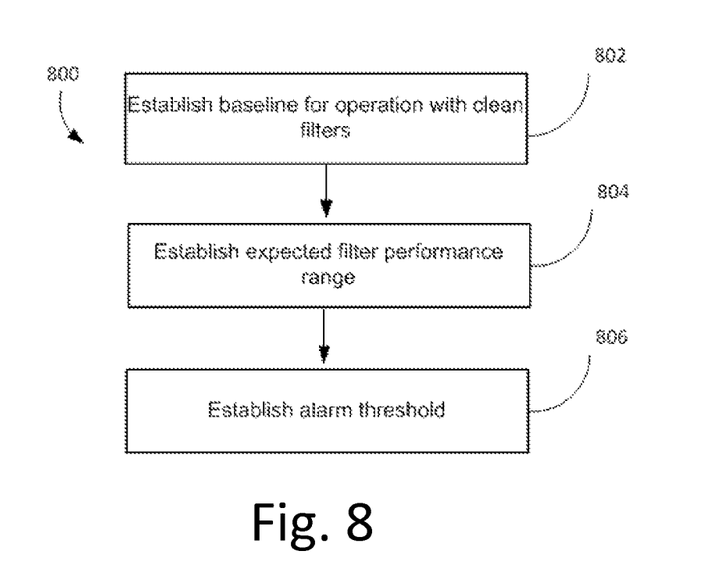
FIG. 8 illustrates a non-limiting, exemplary method of implementing a filter monitoring and cleaning system.

FIG. 8 illustrates a non-limiting, exemplary method 800 of implementing a filter monitoring and cleaning system. At 802, a baseline for clean filter operation may be established. Establishing a baseline may include determining calibrated clean filter weight and determining clean filter differential pressure, among other things. At 804, there may be an analysis of filter section performance in order to establish an expected filter performance range (i.e., predict future filter performance based on past performance). Expected filter section performance range analysis may be based on data over several hours of operations (e.g., months or years). The expected filter section performance may also further correspond to the season (e.g., spring or summer), weather conditions (e.g., wind or rain), or the like. At 806, alarm or alert thresholds may be established based on expected filter section performance In an embodiment thresholds may be established for expected filter weight (e.g., rate of loading) over a time period. For example, a slower than expected increase in weight of the filter section may be indicative of inlet air stratification, unseated or a ruptured filter(s) within a at the filter section (e.g., area 702). As a result an alert message may be sent to an operator to schedule a filter house inspection or schedule filter replacements in a filter section. In another example, a faster than expected increase in weight may be indicative of an upstream rupture of a filter, a liquid fluid leak onto the filter, or the like. An operator may be alerted to inspect a filter section or a puffer system may be engaged to try to clean the filter section that increased in weight. Over time filter house data such as weight of a filter section, differential pressure, number of puffs to reduce a filter weight, and the like may be used to indicate whether there is an upstream rupture, where an upstream rupture may be located, where a leak may be located, whether filter elements have reached their end of life, and the like.

The filter monitoring and cleaning system may be further enhanced with the addition of system display graphics in a control room. Local LED lights wired into the individual control circuitry for each filter element group may be illuminated when the loading limit has been exceeded or the puffing system is ineffective in recovering lost filter performance. The same concept may be applicable for filter element groups on all levels and rows of filters in a filter house.

Figure 9:
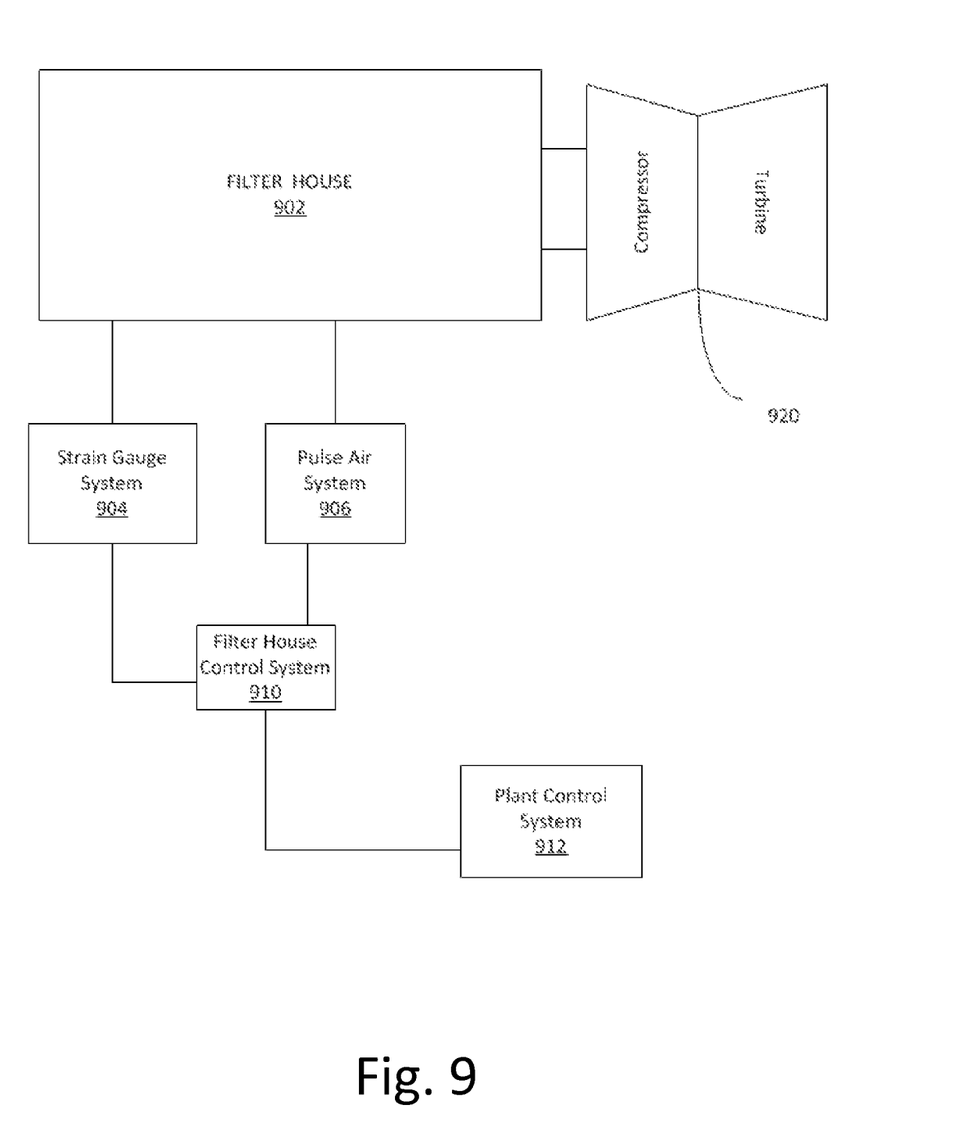
FIG. 9 is an exemplary illustration of a filter house monitoring and cleaning system.

FIG. 9 is an exemplary illustration of a filter house monitoring and cleaning system. Filter house 902 may be physically connected to compressor/turbine 920. Devices such as strain gauge load cells or solenoid valves within filter house 902 may be communicatively connected with strain gauge system 904 (generally considered a weighing system) and a pulse air system 906. Strain gauge system 904 and a pulse air system 906 may be communicatively connected with filter house control system 910. Filter house control system 910 may be communicatively connected with plant control system 912. Strain gauge system 904 may collect weight data from strain gauge load cells and communicate it to the filter house control system 910. Pulse air system 906 may communicate with the solenoid valves and other related pulse air equipment. Filter house control system 910 may determine an alarm condition (e.g., crossing of a threshold) and communicate with strain gauge system 904, pulse air system 906, and plant control system 912, among other things, via an alert message to take appropriate action in consideration of the alarm condition. For example, the alert message may comprise instructions or signal to initiate an air pulse. The communication paths described herein may be wired or wireline. The systems and subsystems discussed herein may be distributed or integrated into one device.

Without in any way limiting the scope, interpretation, or application of the claims appearing herein, a technical effect of one or more of the example embodiments disclosed herein is to provide adjustments to directed maintenance of a group of degrading filters that may allow the replacement of some and not all filters at the same time, and thus reduce outage duration. Another technical effect of one or more of the embodiments disclosed herein is that analysis of the alarms with regard to the filter monitoring system may allow for the determination of a stratified air flow pattern through the filter house. Determination of the stratified flow pattern may allow for further development of a filter house design, such as adding or subtracting components to more evenly distribute the air flow and dust collection throughout the filter house.

Figure 10:
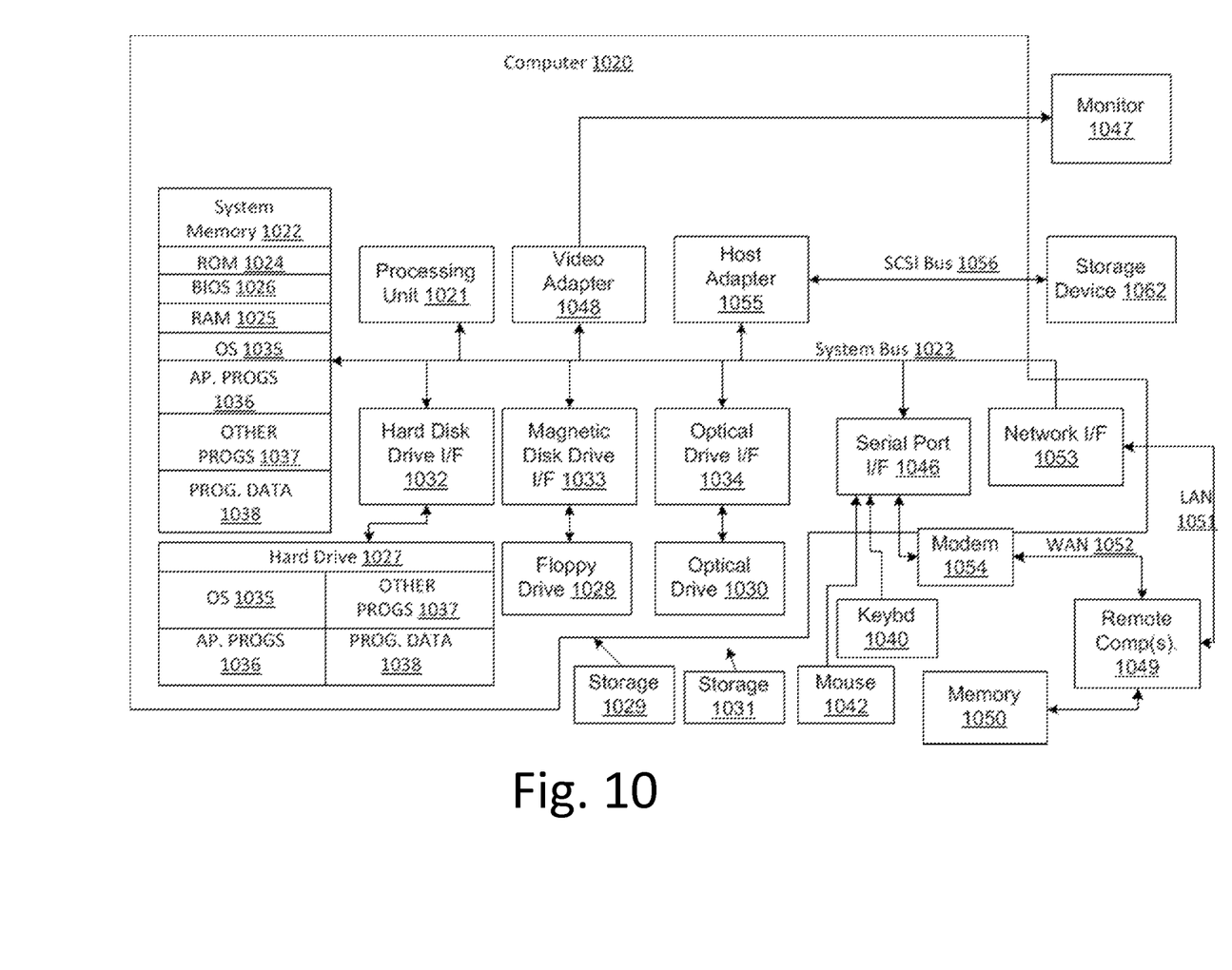
FIG. 10 is an exemplary block diagram representing a general purpose computer system in which aspects of the methods and systems disclosed herein or portions thereof may be incorporated.

FIG. 10 and the following discussion are intended to provide a brief general description of a suitable computing environment in which the filter monitoring and cleaning method, devices, and systems disclosed herein and/or portions thereof may be implemented. Although not required, the methods and systems disclosed herein may be described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated the methods and systems, such as the strain gauge system 904, pulse air system 906, filter house control system 910, and the plant control system 912, disclosed herein and/or portions thereof may be practiced with other computer system configurations, including hand-held devices, multi-processor systems, microprocessor-based or programmable consumer electronics, network PCs, mini-computers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 10 is a block diagram representing a general purpose computer system in which aspects of the methods and systems disclosed herein and/or portions thereof may be incorporated. As shown, the exemplary general purpose computing system includes a computer 1020 or the like, including a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of computer readable instructions, data structures, program modules and other data for the computer 1020. As described herein, computer-readable media is an article of manufacture and thus not a transient signal.

Although the exemplary environment described herein employs a hard disk, a removable magnetic disk 1029, and a removable optical disk 1031, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, removable magnetic disk 1029, removable optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus 1023, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 10 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 10. The logical connections depicted in FIG. 10 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communication over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communication link between the computers may be used.

Computer 1020 may include a variety of computer readable storage media. Computer readable storage media can be any available media that can be accessed by computer 1020 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer readable media that may be used to store source code for implementing the methods and systems described herein. Any combination of the features or elements disclosed herein may be used in one or more embodiments.

Figure 11:
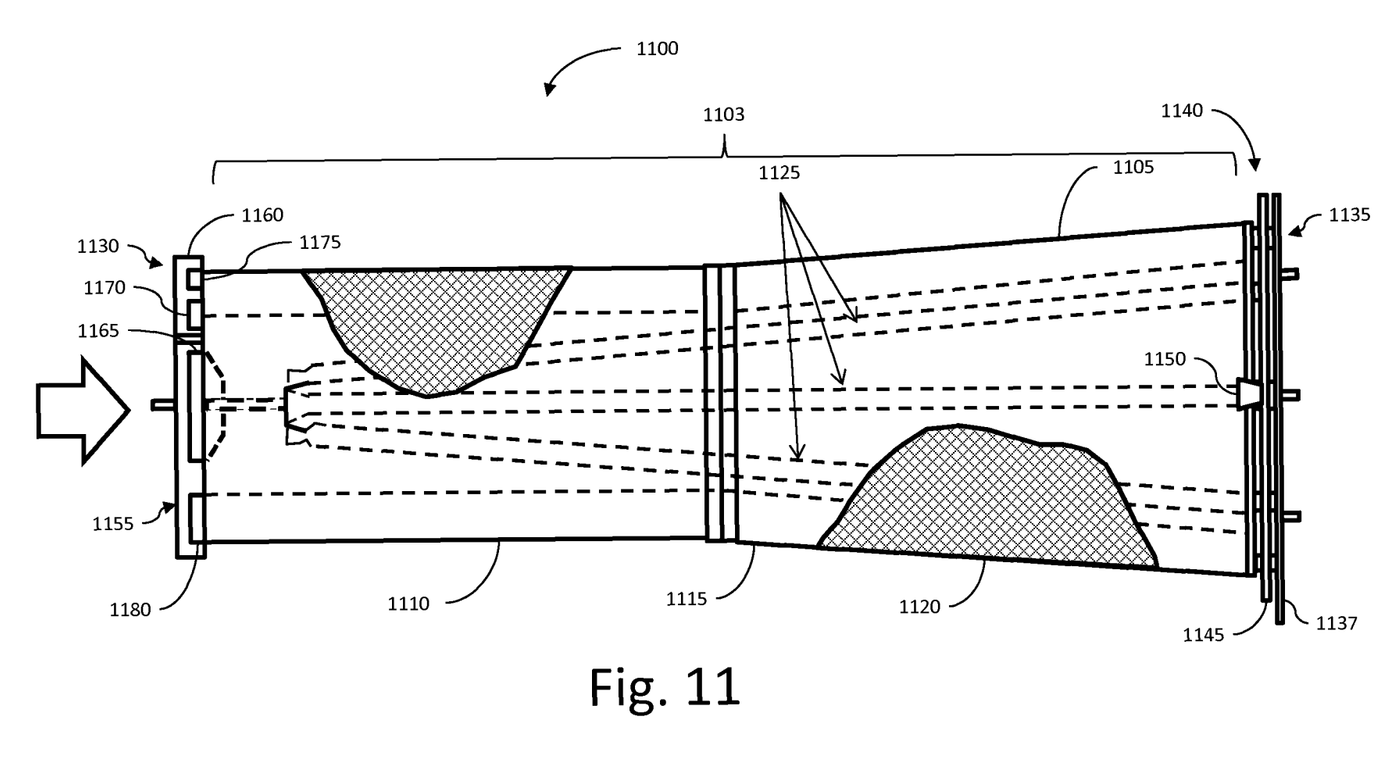
FIG. 11 is a side elevation, partly cut away view of a smart filter assembly.

Illustrated in FIG. 11 is an embodiment of a smart filter assembly 1100. The smart filter assembly 1100 includes a filter component 1103. The filter component 1103 includes a housing 1105 that defines a cylindrical section 1110 and a conical section 1115. The filter component 1103 may also be of an individual cylindrical or a conical design, as compared to a stacked dual-element. The filter component 1103 also includes a filter component 1120 supported by a supporting structure 1125. The filter component 1120 may be made of any suitable media such as paper, blended paper with polymers, synthetic fiber paper, and synthetic nonwoven polymers, and fiberglass among others. The filter component 1103 has an inlet 1130 and an outlet 1135. The filter component 1103 may be attached to a tube sheet 1137 through the supporting structure 1125.

The smart filter assembly 1100 may include a pulse cleaning component 1140. The pulse cleaning component 1140 includes an air manifold 1145 and a nozzle 1150. High-pressure pulses of air may be emitted through the nozzle 1150 to clean the filter component 1103 at predetermined time intervals.

Figure 12:
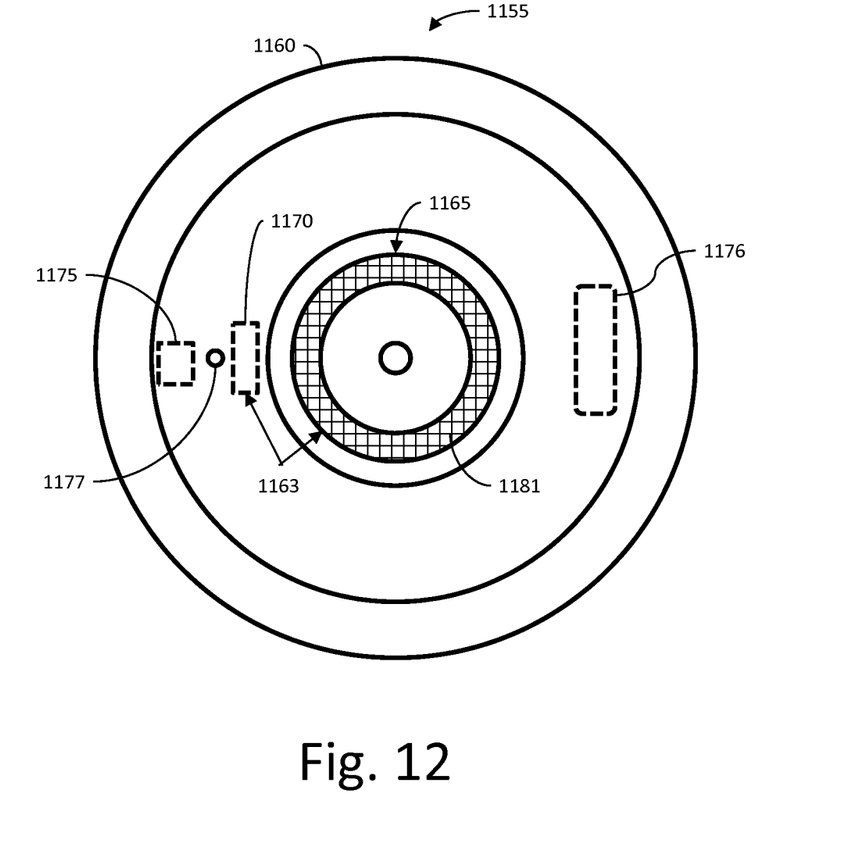
FIG. 12 is a plan view of a fouling detection assembly.

The smart filter assembly 1100 includes a fouling detection assembly 1155, illustrated in more detail in FIG. 12. The fouling detection assembly 1155 includes an end cap 1160 that supports a fouling detection component 1163. The end cap 1160 may be pre-assembled and manufactured with the filter component 1103 or may be assembled in the field on to a "standard" filter component 1103. The fouling detection component 1163 provides a signal correlated to the degree of fouling of the smart filter assembly 1100. The fouling detection component 1163 may be a fouling detection instrument 1165 such as a plurality of strain gauge elements 1181 that measure the weight of the smart filter assembly 1100 or the torque acting on the supporting structure 1125. An alternate fouling detection component 1163 may be a differential pressure sensor 1170 that measures the pressure differential between the exterior of the end cap 1160 and the pressure in the filter component 1103. The differential pressure sensor 1170 may be a piezoresistive strain gauge sensor, a piezoelectric sensor, a capacitive sensor or other suitable electronic pressure sensor.

The fouling detection assembly 1155 also includes a communication module 1175 capable of wireless communication. The communication module 1175 may operate in accordance with an appropriate standard such as IEEE 802.11, Bluetooth, or ZigBee.

The fouling detection assembly 1155 may be provided with a battery 1176 to power the fouling detection component 1163 and the communication module 1175. The fouling detection assembly 1155 may also include an LED lamp 1177 that acts as a visual status indicator that the power and instrumentation in the fouling detection assembly 1155 is operational. The LED lamp 1177 simplifies routine service and troubleshooting of defective components by providing positive visual indication of self-check status.

Figure 13:
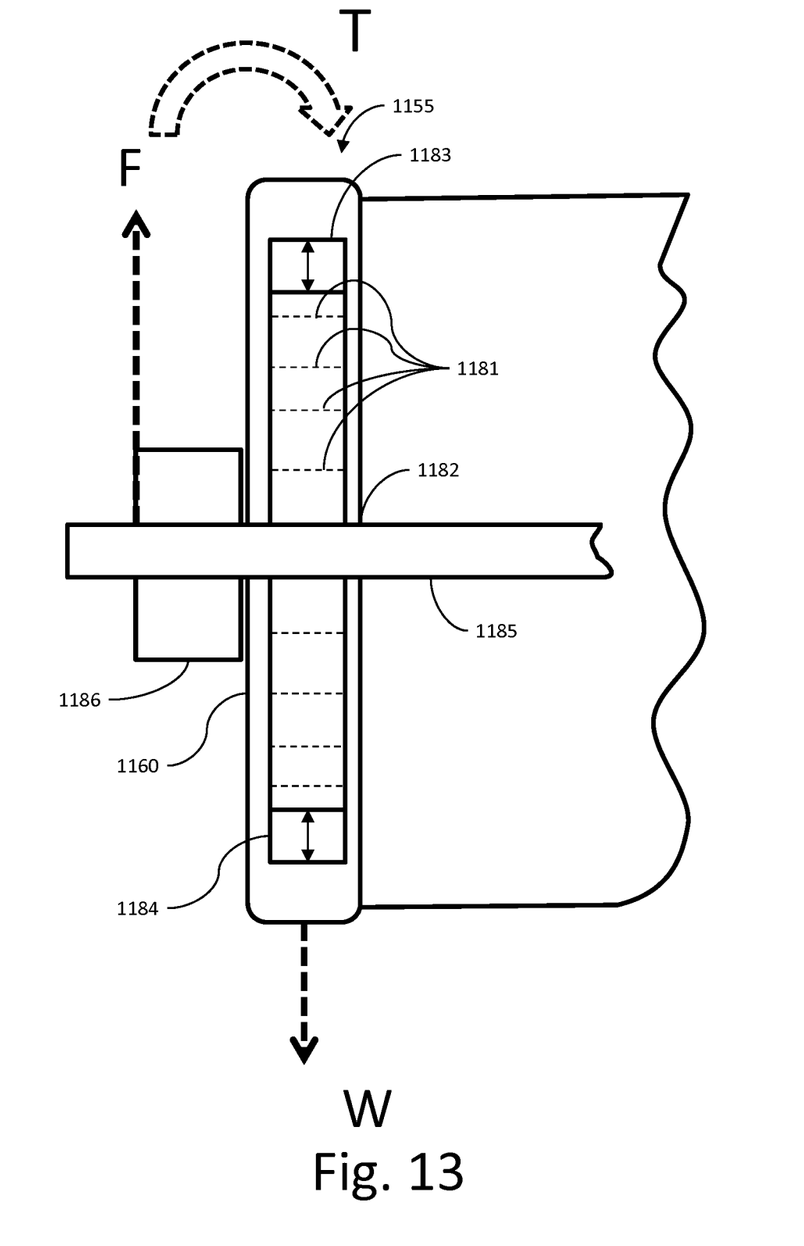
FIG. 13 is a cross sectional side view of the fouling detection assembly.

FIG. 13 is a cross sectional view of an embodiment of the fouling detection assembly 1155. A plurality of strain gauge elements 1181 (as shown in FIG. 12) are radially arranged around the center mount hole 1182 such that regardless of the radial orientation of the fouling detection assembly 1155, an upper strain gauge element 1183 and a lower strain gauge element 1184 are always substantially vertical. The upper strain gauge element 1183 and the lower strain gauge element 1184 are subject to the largest forces, relative to the remaining strain gauge elements 1181. The upper strain gauge element 1183 would be in compression and the lower strain gauge element 1184 would be in tension, due to the weight of the filter W and the corresponding reaction force F on a mounting bolt 1185. The fouling detection assembly 1155 is secured to the mounting bolt 1185 with nut 1186. The upper strain gauge element 1183 and the lower strain gauge element 1184 may also measure the torque T acting on the fouling detection assembly 1155. The fouling detection assembly 1155 is configured to calibrate itself to initial conditions by identifying these relative largest measurements (corresponding to upper strain gauge element 1183 and the lower strain gauge element 1184) and ignoring the remaining of the plurality of strain gauge elements 1181 within the array for the duration of filter service life. The filter weight W will change over time, increasing with dirt loading and decreasing with puff cleaning. The filter weight W is detected by the self-contained system in the end cap 1160 and a value associated with the filter weight is wirelessly transmitted continuously or intermittently to a central control system such as control system 1230 in FIG. 15.

Figure 14:
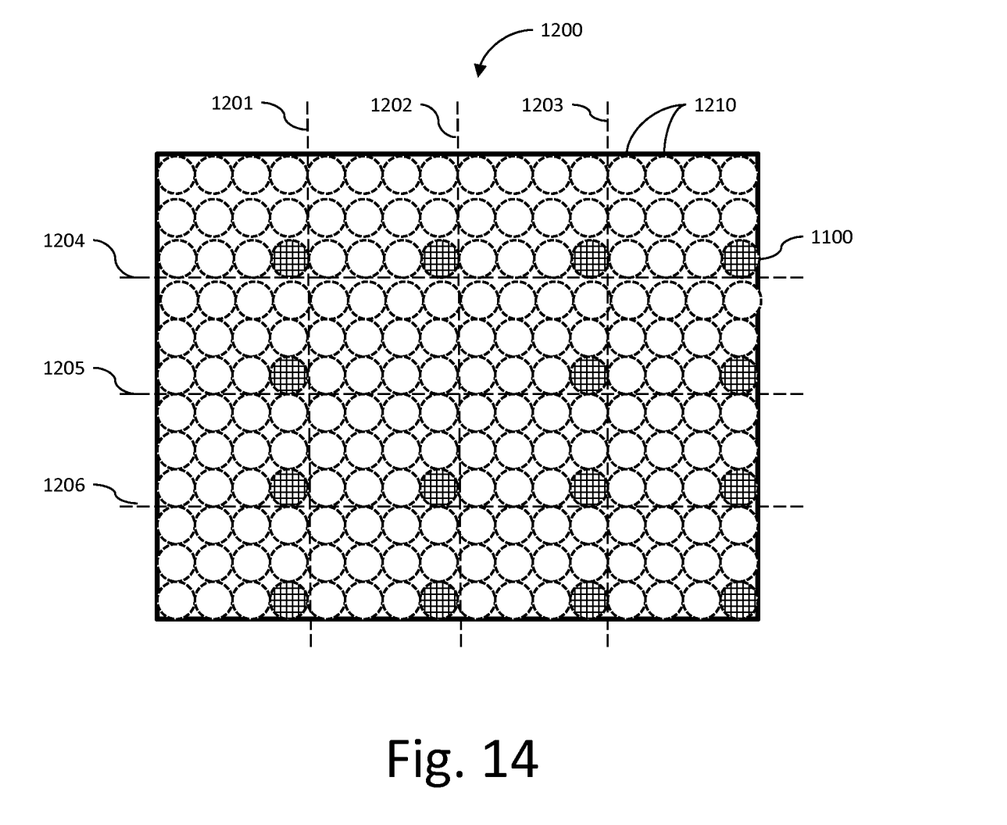
FIG. 14 is a schematic diagram of an illustrative embodiment filter system.

Illustrated in FIG. 14 is a schematic diagram of an illustrative embodiment filter system 1200. The filter system 1200 is subdivided into zones defined by vertical grid lines 1201, 1202, 1203, and the horizontal gridlines 1204, 1205, and 1206. Disposed within each zone are a plurality of filter assemblies 1210 and at least one smart filter assembly 1100.

Figure 15:
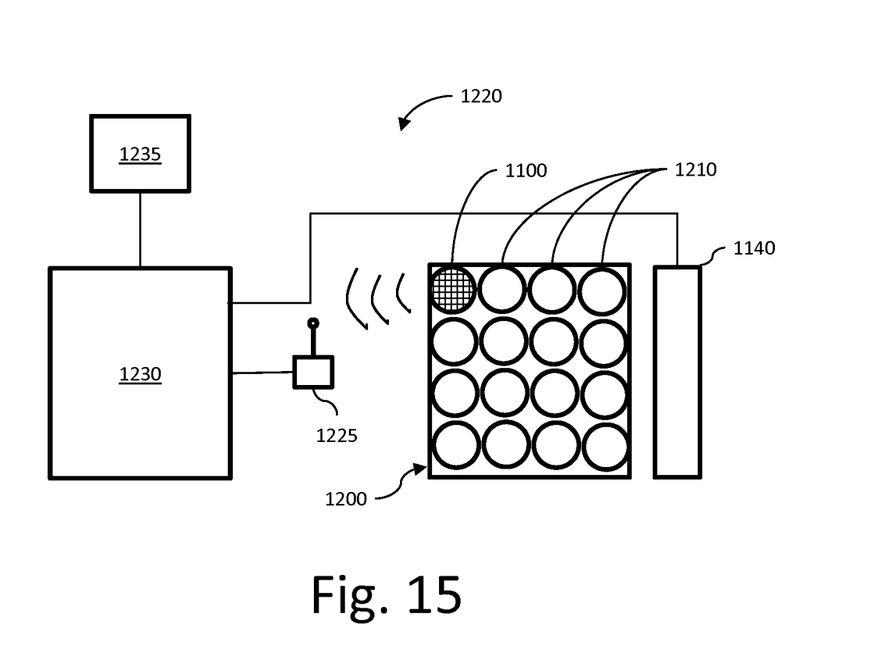
FIG. 15 is a schematic diagram of an illustrative filter servicing system.

The use of a smart filter assembly 1100 enables the turbine operator to service the power plant system 105 (shown in FIG. 1) when the filter assemblies 1210 become dirty or fouled. For example, illustrated in FIG. 15 is a filter servicing system 1220 for servicing a filter system 1200. The filter servicing system 1220 includes a filter system 1200 having a plurality of filter assemblies 1210 and at least one smart filter assembly 1100. The filter servicing system 1220 also includes a pulse cleaning component 1140 coupled to the filter system 1200. A wireless receiver 1225 receives signals from the smart filter assembly 1100 that are indicative of the degree of fouling of the smart filter assembly 1100. The degree of fouling may be correlated to the weight of the smart filter assembly 1100, the torque acting on the smart filter assembly 1100, or the difference in pressure between the exterior and the interior of the smart filter assembly 1100. The wireless receiver 1225 transmits the signal to a control system 1230 that determines whether the degree of fouling of the smart filter assembly 1100 exceeds a predetermined level. If the degree of fouling of the smart filter assembly 1100 exceeds the predetermined level the control system 1230 may engage the pulse cleaning component 1140 to clean the affected smart filter assembly 1100 and the filter assemblies 1210. Alternately the control system 1230 may notify an operator computer 1235 indicating that the filter system 1200 requires cleaning or that the filter system 1200 should be replaced.

Figure 16:
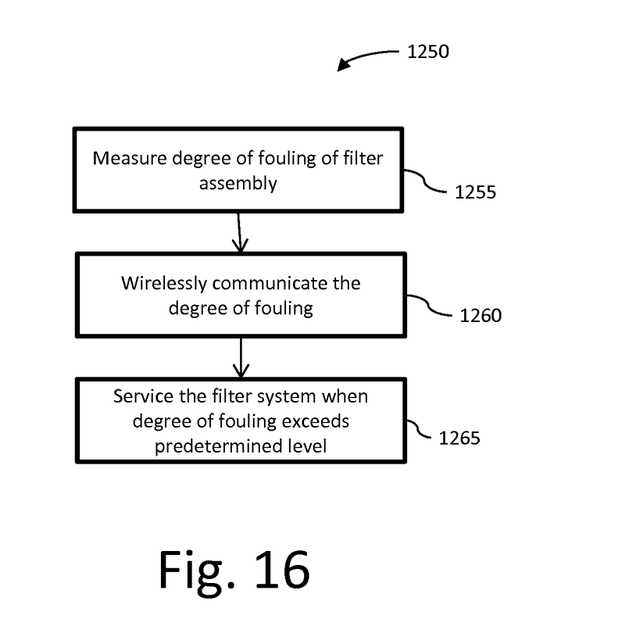
FIG. 16 is a flow chart of a method for servicing a filter system.

Illustrated in FIG. 16 is a method 1250 for servicing a filter system 1200. In step 1255 the method 1250 measures the degree of fouling of one or more smart filter assembly 1100. The degree of fouling may be measured using a smart filter assembly 1100 that measures signals proportional to the weight of the smart filter assembly 1100, the torque acting on the smart filter assembly 1100, or the pressure differential between the exterior and the interior of the smart filter assembly 1100. The signals proportional to the weight of the smart filter assembly 1100 may be provided by a fouling detection instrument 1165 such as a strain gauge.

In step 1260 method 1250 wirelessly communicates the degree of fouling to a control system such as control system 1230 in FIG. 15. The communication is effected by a communication module 1175 (illustrated in FIG. 12).

In step 1265 the method 1250 services the filter system 1200. Servicing may be initiated by engaging the pulse cleaning component 1140 when the degree of fouling exceeds a predetermined limit, or communicating to an operator that the filter assemblies need to be changed. The degree of fouling may be measured using a smart filter assembly 1100.

Where the definition of terms departs from the commonly used meaning of the term, applicant intends to utilize the definitions provided below, unless specifically indicated.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

An embodiment the filter monitoring and cleaning system may comprise a microprocessor based control system with built in rules and predetermined logic. The filter monitoring and cleaning system may be in communication with a pulse air cleaning system to control the activation, deactivation, and duration of activation of the system, which may include solenoid valves, and the like to clean specific segments or plurality of segments that have exceeded a predetermined weight threshold. All levels, which may also be known as decks, and rows of the filter house may be subdivided into smaller modules (subdivided segments) as shown in FIG. 4. The modules may be configured with strain gauges or other weight measuring devices so as to discern any increase in weight (e.g., filter loading) that may be indicative of a reduction in filtration efficiency (e.g., increase in pressure drop—differential pressure).

Strain gauge load cells, as discussed herein, convert the load acting on them into electrical signals. The strain gauges may be bonded onto a beam or structural member that deforms when weight is applied. In an embodiment, four strain gauges may be used per section to obtain sensitivity and temperature compensation. For example, two of the strain gauges may be in tension and two may be in compression. All strain gauges may be wired with compensation adjustments. When weight is applied, the strain changes the electrical resistance of the strain gauges in proportion to the load. Although strain gauge load cells are discussed herein, other devices that measure weight or similar changes in filter disposition may be used. In the case of multiple strain gauges, an operator may choose to use the average weight, median weight, weight change of any one of a single strain gauge, or any number of combinations.

Although filter house data such as weight of a filter section may be considered herein, other filter house data such as differential pressure, humidity, temperature, and the like along with other environmental data such as weather may be used to determine actions by the filter monitoring and cleaning system. "Crossing" a threshold, as discussed herein, may be moving above or below an established number that is used to indicate when an action (e.g., puffing or an alarm) should be triggered. For example, a threshold may be crossed if the weight of a section is above a certain amount, which may indicate filters in that section should be puffed for a predetermined time or until a threshold is crossed—indicating recovered filtration capability—before being terminated. In another example, a threshold may be crossed if a weight of a filter is below a predetermined amount over a period of time, which may indicate a filter group has a low loading rate which could be indicative of stratified flow and thus clean/lightly loaded filters and deactivation of the puffing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

What is claimed:

1. A gas turbine filter assembly comprising:
   an inlet filter house;
   a plurality of filter components disposed in the inlet filter house;
   and
   wherein at least one of the filter components comprises a smart filter component having an end cap, a supporting structure and a strain gauge disposed on the end cap and coupled to the supporting structure, the strain gauge being adapted to measure a physical parameter acting on the supporting structure wherein the physical parameter is correlated to a degree of fouling of the filter component; and
   a wireless communication module coupled to the strain gauge adapted to wirelessly communicate the parameter to a controller.

2. The filter assembly of claim 1, wherein the smart filter component further comprises a plurality of stain gauges radially disposed around a center mount hole on the end cap.

3. The filter assembly of claim 1, wherein the physical parameter is a weight of the filter component.

4. The filter assembly of claim 1 wherein the communication module comprises a wireless communication system operating in accordance with a Bluetooth standard.

5. The filter assembly of claim 1, wherein the the physical parameter is a force acting on the supporting structure.

6. The filter assembly of claim 2, wherein the physical parameter is a torque acting on the supporting structure.

* * * * *